United States Patent
Ma

(10) Patent No.: US 6,562,941 B2
(45) Date of Patent: May 13, 2003

(54) PROCESS FOR PRODUCTION OF POLYASPARAGINE AND THE HIGH NITROGEN CONTENT POLYMER FORMED THEREBY

(75) Inventor: Zhongxin Ma, Ridgeland, MS (US)

(73) Assignee: Mississippi Chemical Corporation, Yazoo City, MS (US)

( * ) Notice: Subject to any disclaimer, the term of this patent is extended or adjusted under 35 U.S.C. 154(b) by 0 days.

(21) Appl. No.: 09/928,439

(22) Filed: Aug. 14, 2001

(65) Prior Publication Data

US 2002/0055613 A1 May 9, 2002

Related U.S. Application Data

(62) Division of application No. 09/598,978, filed on Jun. 21, 2000.

(51) Int. Cl.⁷ ............................. C08G 63/44; C05C 1/00
(52) U.S. Cl. ..................... 528/363; 528/328; 523/132; 71/27
(58) Field of Search ................................ 528/328, 363; 71/27; 525/418, 419, 420; 523/132

(56) References Cited

U.S. PATENT DOCUMENTS

| | | | |
|---|---|---|---|
| 2,743,246 A | 4/1956 | Lotz et al. | |
| 2,743,247 A | 4/1956 | Lotz et al. | |
| 2,743,248 A | 4/1956 | Lotz et al. | |
| 3,632,646 A | 1/1972 | Hageman et al. | |
| 3,798,838 A | * 3/1974 | Hashimoto et al. | 47/58.1 R |
| 4,018,753 A | 4/1977 | Inouye et al. | |
| 4,018,754 A | 4/1977 | Inouye et al. | |
| 4,534,881 A | 8/1985 | Sikes et al. | |
| 4,785,021 A | 11/1988 | Kiniwa | |
| 4,839,461 A | 6/1989 | Boehmke | |
| 4,868,132 A | 9/1989 | Byrnes et al. | |
| 5,057,597 A | 10/1991 | Koskan | |
| 5,175,285 A | 12/1992 | Lehmann et al. | |
| 5,229,469 A | 7/1993 | Krone et al. | |
| 5,266,305 A | 11/1993 | Wood et al. | |
| 5,292,858 A | 3/1994 | Wood | |
| 5,306,429 A | 4/1994 | Wood et al. | |
| 5,315,010 A | 5/1994 | Koskan et al. | |
| 5,317,065 A | 5/1994 | Krone et al. | |
| 5,329,020 A | 7/1994 | Kalota et al. | |
| 5,357,004 A | 10/1994 | Calton et al. | |
| 5,371,180 A | 12/1994 | Groth et al. | |
| 5,389,303 A | 2/1995 | Wood et al. | |
| 5,391,764 A | 2/1995 | Koskan et al. | |
| 5,468,838 A | 11/1995 | Boehmke et al. | |
| 5,470,942 A | 11/1995 | Alexander et al. | |
| 5,484,860 A | 1/1996 | Wood et al. | |
| 5,491,213 A | 2/1996 | Batzel | |
| 5,493,004 A | 2/1996 | Groth et al. | |
| 5,508,434 A | 4/1996 | Batzel et al. | |
| 5,525,682 A | 6/1996 | Nagatomo et al. | |
| 5,525,703 A | 6/1996 | Kalota | |
| 5,530,091 A | 6/1996 | Wagner et al. | |
| 5,540,863 A | 7/1996 | Wood et al. | |
| 5,543,490 A | 8/1996 | Groth et al. | |
| 5,552,516 A | 9/1996 | Ross et al. | |
| 5,571,889 A | 11/1996 | Katoh et al. | |
| 5,594,077 A | 1/1997 | Groth et al. | |
| 5,610,255 A | 3/1997 | Groth et al. | |
| 5,610,264 A | 3/1997 | Wood et al. | |
| 5,618,910 A | 4/1997 | Groth et al. | |
| 5,681,920 A | 10/1997 | Vallino et al. | |
| 5,686,066 A | 11/1997 | Harada et al. | |
| 5,714,558 A | 2/1998 | Groth et al. | |
| 5,733,868 A | 3/1998 | Peterson et al. | |
| 5,739,393 A | 4/1998 | Wagner et al. | |
| 5,750,070 A | 5/1998 | Tang et al. | |
| 5,770,553 A | 6/1998 | Kroner et al. | |
| 5,773,564 A | 6/1998 | Sikes | |
| 5,811,032 A | 9/1998 | Kawai et al. | |
| 5,830,985 A | 11/1998 | Kroner et al. | |
| 5,852,109 A | 12/1998 | Makino et al. | |
| 5,854,378 A | 12/1998 | Tomida et al. | |
| 5,854,384 A | 12/1998 | Kuroda et al. | |
| 5,856,427 A | 1/1999 | Chou | |
| 5,859,149 A | 1/1999 | Martin | |
| 5,859,179 A | 1/1999 | Chou | |
| 5,861,356 A | * 1/1999 | Koskan et al. | 504/149 |
| 5,869,027 A | 2/1999 | Wood et al. | |
| 5,880,070 A | 3/1999 | Harrison et al. | |
| 5,885,474 A | 3/1999 | Reiners et al. | |
| 5,888,959 A | 3/1999 | Kroner et al. | |
| 5,889,072 A | 3/1999 | Chou | |
| 5,902,357 A | 5/1999 | Riegels et al. | |
| 5,904,936 A | 5/1999 | Huille et al. | |
| RE36,234 E | 6/1999 | Koskan et al. | |
| 5,908,885 A | 6/1999 | Sikes et al. | |
| 5,910,564 A | 6/1999 | Grüning et al. | |
| 5,919,697 A | 7/1999 | Salmon et al. | |
| 5,919,894 A | 7/1999 | Schubart | |
| 5,925,728 A | 7/1999 | Kim et al. | |
| 5,929,198 A | 7/1999 | Tang | |
| 5,939,518 A | 8/1999 | Mazo et al. | |
| 5,939,522 A | 8/1999 | Mazo et al | |
| 5,942,150 A | 8/1999 | Heuer et al. | |
| 5,955,549 A | 9/1999 | Chang et al. | |
| 5,961,965 A | 10/1999 | Kim et al. | |
| 5,962,400 A | 10/1999 | Thomaides et al. | |
| 5,981,691 A | * 11/1999 | Sikes | 528/328 |
| 5,986,042 A | 11/1999 | Irizato et al. | |
| 5,998,491 A | 12/1999 | Haar, Jr. | |
| 5,998,492 A | 12/1999 | Haar, Jr. et al. | |
| 6,001,798 A | 12/1999 | Baur et al. | |
| 6,005,069 A | 12/1999 | Mazo et al. | |
| 2002/0055613 A1 | * 5/2002 | Ma | 528/363 |

FOREIGN PATENT DOCUMENTS

| | | |
|---|---|---|
| DE | 03775138 | 7/1987 |
| EP | 0 625 531 A1 | 11/1994 |
| JP | 09232494 | 8/1997 |

* cited by examiner

*Primary Examiner*—P. Hampton-Hightower
(74) *Attorney, Agent, or Firm*—Oblon, Spivak, McClelland, Maier & Neustadt, P.C.

(57) ABSTRACT

A method for the production of polyasparagine is provided wherein the polyasparagine is prepared by ammonolysis of polysuccinimide in liquid ammonia, acting both as a solvent and as a reactant, wherein the polysuccinimide can be any polysuccinimide, such as linear, branched or cross-linked, wherein the polyasparagine produced has high % N content and is neutral as opposed to anionic or cationic.

3 Claims, 3 Drawing Sheets

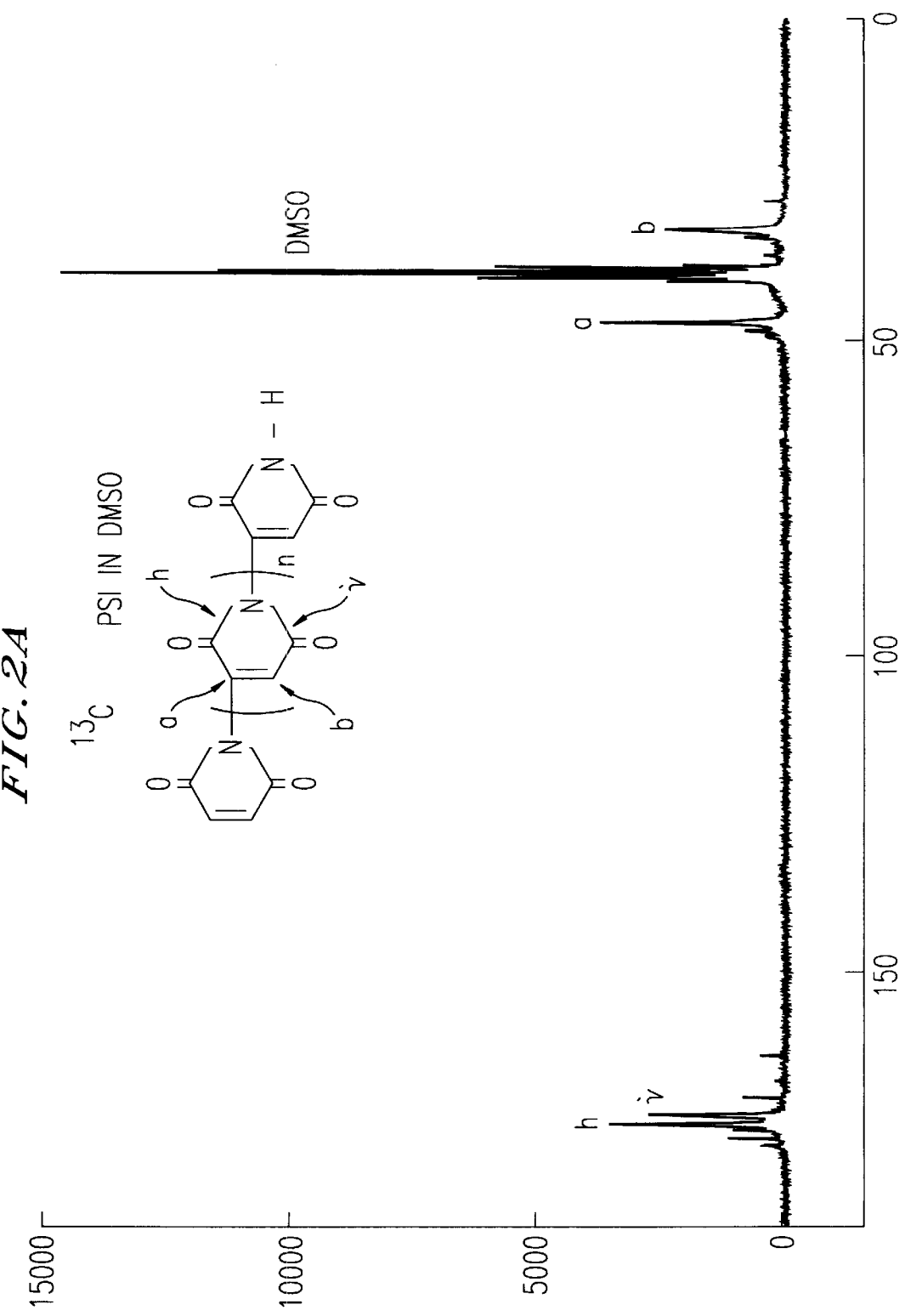

PROCESS FOR PRODUCTION OF POLYASPARAGINE AND THE HIGH NITROGEN CONTENT POLYMER FORMED THEREBY

BACKGROUND OF THE INVENTION

1. Field of the Invention

This invention relates to a process of producing polyasparagine having high nitrogen content, and the product produced thereby, using maleic anhydride and ammonia as starting materials, with ammonia as solvent also.

2. Discussion of the Background

Polyaspartates, as very promising biodegradable anionic polymers, have been widely investigated recently, because they have very broad applications. These ionic polymers usually are produced by hydrolysis processes of polysuccinimides with a variety of bases as catalysts.

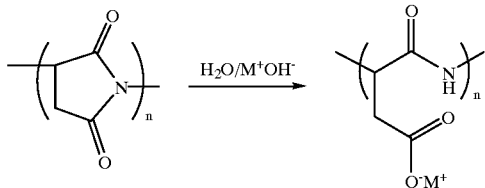

Where M is a metal ion, inorganic, or an organic ion.

Various methods for producing polyaspartic acids and polyaspartates have been proposed in the past. Groth et al, U.S. Pat. No. 5,594,077 discloses the production of polyaspartic acid by hydrolysis of polysuccinimide (PSI) to produce a product having pendant carboxylic acid groups, and the salts produced by neutralizing these acid groups. Groth, U.S. Pat. No. 5,493,004, also discloses production of polyaspartic acids having pendant acid groups. This patent discloses a polyasparagine polymer structure, but the polymers disclosed have low molecular weights of about 2700, and which are prepared using aqueous ammonia. The use of aqueous ammonia as disclosed in the patent results in a mixture of ammonolysis and hydrolysis products. The polymers produced are also disclosed as containing PSI groups.

Wagner et al, U.S. Pat. No. 5,530,091, discloses the production of PSI or maleic amide acid by hydrolysis of PSI. Boehmke, U.S. Pat. No. 4,839,461 discloses production of polyaspartic acid and its salts by reaction of maleic anhydride and water, then addition of one mole of ammonia to form the acid ammonium salt of maleic acid.

None of the above described references discloses the preparation of high nitrogen content neutral polyasparagine, in which there are primarily only amide groups pendant on the polymer chain. There is a need for such a high nitrogen content product for use in controlled nitrogen release applications, such as fertilizer.

SUMMARY OF THE INVENTION

Accordingly, one object of the present invention is to provide a method for the production of high nitrogen content polyamino acids, particularly polyasparagines.

A further object of the present invention is to provide a method for the production of polyasparagine from polysuccinimide that results in a neutral product substantially free of free acid groups or their salts.

A further object of the present invention is to provide a high nitrogen content neutral polyasparagine useful for controlled release nitrogen applications.

These and other objects of the present invention have been satisfied by the discovery of a method for production of polyasparagine, comprising:

reacting polysuccinimide or a derivative thereof, with liquid ammonia, preferably as both solvent and reactant, at a temperature and pressure sufficient to cause ring opening ammonolysis of the polysuccinimide or derivative thereof, and the polyasparagine produced thereby, as well as its uses in a wide variety of applications.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIGS. 2a and 2b provide $^{13}C$ NMR spectra of starting material PSI and the product PASN produced by the reaction of the present invention, respectively.

DETAILED DESCRIPTION OF THE PREFERRED EMBODIMENTS

Figure 1:
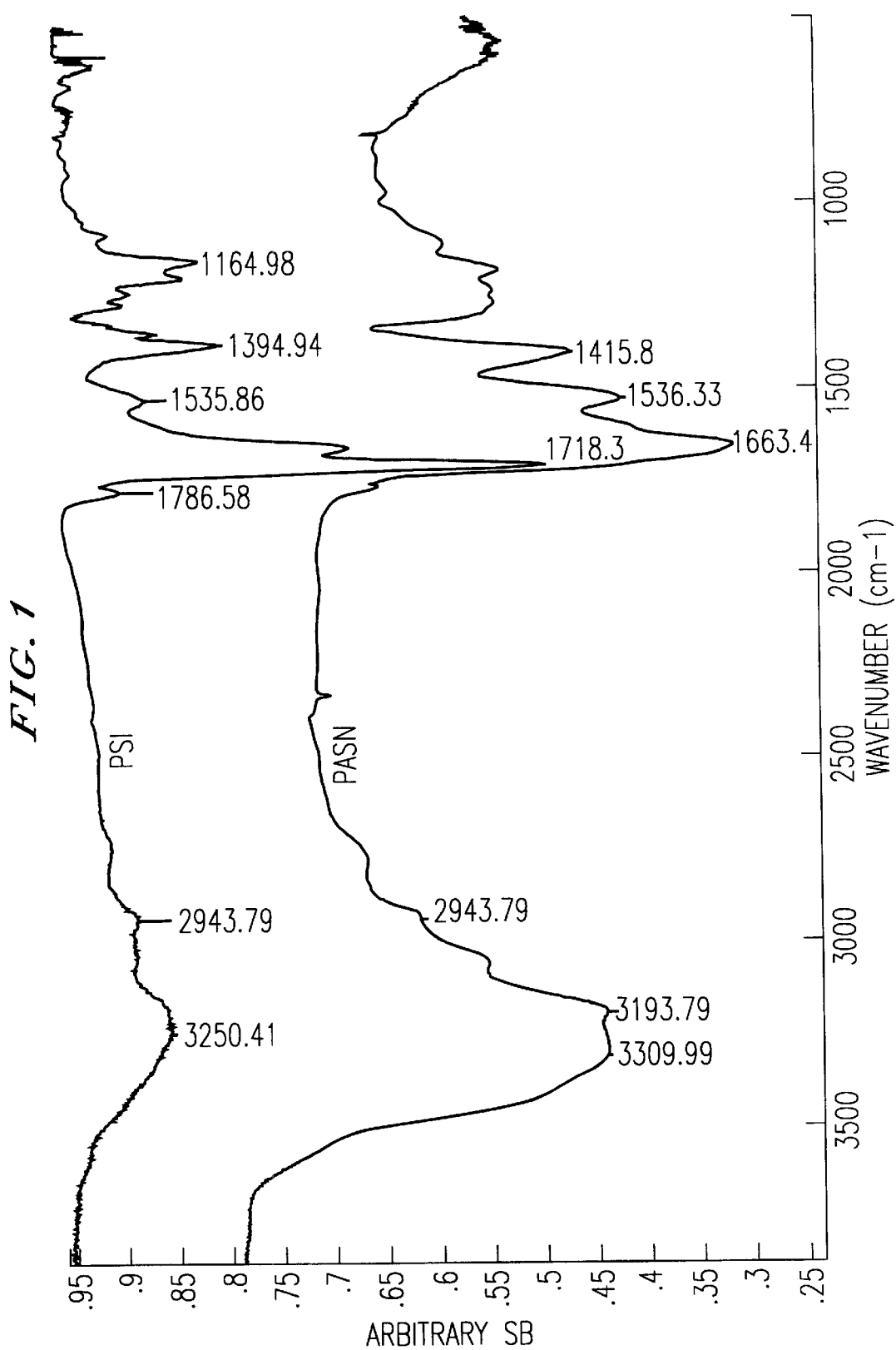
FIG. 1 provides FTIR spectra of starting material PSI and the product polyasparagine (PASN) produced in the reaction of the present invention.

The present invention relates to a method for the production of PASN having high nitrogen content by ammonolysis of polysuccinimide (PSI). Unlike conventional methods for production of polyaspartic acid polymers and polyaspartates, the present invention uses ammonolysis in liquid ammonia, not hydrolysis or ammonolysis in aqueous or organic solvent, providing the advantages as noted below. Further, the polymer produced by the present method is neutral polyasparagine, not an anionic or cationic species.

The present invention process comprises ammonolysis of PSI in liquid ammonia as a solvent. In the present invention, the liquid ammonia acts both as a solvent and as a reactant. Because the present method uses liquid ammonia, the present process can avoid related reactions present in conventional methods, such as hydrolysis (present in methods using a variety of bases as catalysts, such as alkali hydroxides and aqueous ammonia). Additionally, some conventional methods use various organic solvents to prepare polyasparagine products. However, organic solvents can interact with the PSI itself or are difficult to completely remove from the reaction. Additionally, disposal concerns exist with organic solvents. By using liquid ammonia, once the reaction is completed, the excess solvent ammonia can be readily removed by evaporation. The evaporant can be collected and recycled for use in further reactions if desired, providing both an environmental and economical benefit.

The reaction can be performed at any combination of temperature and pressure sufficient to provide essentially complete reaction, with temperatures of −33 to 135° C. and pressures from ambient to several atmospheres being preferred. Preferably, the reaction is performed at a temperature from −33 to 70° C., most preferably from 0 to 50° C. Preferred pressures for the reaction are from 0 to 2000 psig, with 0 to 500 psig being most preferred. The reaction is preferably performed for a time period of from 10 min to 24 h, with reaction times of 1–5 h being most preferred, particularly from a production efficiency and throughput standpoint.

The reaction is performed using a ratio (by weight) of PSI to ammonia sufficient to provide essentially complete reaction. A preferred ratio of PSI:NH$_3$ is 1:0.17 to 1:100, most preferably from 1:2 to 1:20, all given as ratios by weight. Further, the reaction is most preferably performed without catalyst.

The reaction can also be performed with addition of other nitrogen containing compounds, such as urea, hydrazine, hydroxylamines, phosphoalkylamines, diamines (such as ethylene diamine or propylene diamine), triamines (such as diethylene triamine), natural and synthetic amino acids, guanidine and other polyamino compounds, in order to provide additional nitrogen incorporation or desired product properties into the final product. In those instances, a modified polyasparagine is formed. In the case of urea, the modified polyasparagine would be poly (N-amido asparagine). Other modified polyasparagines include polyhydroxyalkyl asparagines, polyphosphoalkyl asparagines and polyaminoalkyl asparagines. In the preparation of the modified polyasparagines, the solvent is maintained as liquid ammonia. This provides the highest possible level of nitrogen incorporation into the final product.

The reaction of the present invention can be performed with or without catalysts. When a catalyst is used, any catalyst capable of catalytic ring opening reaction of PSI can be used, with sodium amide and sodium sulfide being preferred.

The PSI used in the method of the present invention can be any modified or unmodified PSI, including but not limited to, linear, crosslinked, grafted and highly branched polymers of PSI, as well as copolymers of PSI of the same classes. The PSI's used in the present invention can be prepared from any desired precursors, such as aspartic acid, asparagine, maleamic acid, maleic acid, maleic anhydride, fumaric acid and salts thereof. The PSI can be produced by any conventional method, including but not limited to, thermally, catalytically, with or without solvents and other aids, and under any conventional conditions, such as ambient temperature and pressure, under vacuum or under elevated pressures.

The process of the present invention provides PASN and its derivatives having both alpha- and beta-type structures. The amino acid residues contained in the PASN polymer chain can be either d- or l-asparagine residues, or both. If a controlled stereochemistry of the final product is desired, the reaction can be run in the presence of an chiral ammonolysis catalyst capable of producing the desired stereochemistry at the ring opening site. This process can be used for providing a drug delivery system. However, for most applications, such stereochemical control is not required.

The polyasparagine produced by the present invention can have any desired molecular weight based upon the conditions employed to perform the reaction. Preferably, the weight average (Mw) molecular weight is greater than 3500, more preferably greater than 5000, most preferably greater than 8000. In determining the molecular weight of the present polymers, it may be necessary to measure the molecular weight against a standard polymer having a known and certified molecular weight, then use the difference between the measured standard and the certified standard Mw to extrapolate the molecular weight of the PASN given the measured value.

Elemental analysis of the polyasparagines of the present invention show that the PASN of the present invention have significantly higher % nitrogen levels than conventionally made polyaspartates and polyaspartic acid derivatives. In particular, the polyasparagines of the present invention have from 21 to 25 wt % of nitrogen present in the polymer, close to the theoretical maximum of approximately 25 wt % nitrogen. This higher % nitrogen level provides added benefits in agricultural applications for the preparation of controlled release nitrogen fertilizers.

When used in preparation of a fertilizer composition the PASN of the present invention is combined with a suitable agricultural carrier, such as herbicides or pesticides, in weight ratios from 1:0.1 to 1:100, preferably from 1:0.2 to 1:10. Additionally, the fertilizer composition can contain other additives common to fertilizers and nitrogen based additives such as urea. Urea is preferably added in amounts from 10 to 90 wt %, relative to the total weight of the composition. The fertilizer composition can be prepared by mixing the PASN with the carrier (and other additives if desired) using methods conventional in the fertilizer industry, including but not limited to melt blending, bulk blending, adding additives such as urea to the reaction during PASN preparation, and combinations thereof.

The controlled release fertilizer composition containing the PASN of the present invention provides controlled release of nutrients when applied to crops or lawns. Using a test of % available nitrogen over time (total of % ammonia-nitrogen and % nitrate-nitrogen), the polyasparagine gave over 30% available nitrogen when used by itself after 21 days, while a 1:1 combination of the present polyasparagine and urea gave over 80% available nitrogen after 21 days.

A crosslinked PSI can also be used as starting material. The crosslinking agent can be used in any desired amount, preferably from 1 to 60 mol % based on total moles of monomers. The crosslinked PSI can be prepared using any desired process, such as thermal or catalytic. For example, the cross-linked PSI can be preferably obtained by reacting (1) 1 molar equivalent of maleic anhydride, or maleic acid, or maleamic acid. and (2) 0 to 5 molar equivalent of anhydrous ammonia or aqueous ammonia, (3) 0.01 to 1 molar equivalent of the crosslinking monomer.

The thermal polymerization process is carried out either in an aqueous solution, organic solution, bulk, or gas-liquid phase to produce the cross-linked polysuccinimide. The reaction temperature is controlled in a range of 130° C. to 400° C. The reaction pressure can range from ambient atmosphere to 1000 psi. The reaction can be performed with or without a catalyst.

When a crosslinked PSI is used as the starting material in the present invention, the cross-linked polyasparagine prepared by ammonolysis is a superabsorbent polymer having use in a wide variety of applications.

The polyasparagine produced in general from the present process can be used in many types of applications, such as agriculture (controlled release fertilizer), waste treatment, superabsorbents, anti-scale agents, cosmetics, detergents, and dispersants.

The following examples are embodiments of the general process discussed hereinabove and intended by way of illustration only and are not intended to limit the invention in any way.

EXAMPLES

Preparation of Polysuccinimide

Into 250 ml of anhydrous liquid ammonia in a beaker, 39.2 g (400 mmol) of maleic anhydride (MA) were carefully added into the solution. The reaction occurred for 30 minutes at −33° C. A white precipitate was formed. After the remaining ammonia was removed by evaporation, the product was dried under vacuum at 40° C. Finally, 52.7 g of maleamic acid ammonia salt (MAA) were obtained. The MAA, in a beaker, was placed in a nitrogen-flowing oven. At about 160° C., the reactant started to melt and turned brown. At approximately the same time, the material started to expand due to the release of ammonia and water vapor. It was then heated at 220° C. for two hours under a nitrogen atmosphere. After cooling down, 38.6 g of brown porous material were obtained.

Production of Polyasparagine

Into a pressured reactor, 19.4 g of polysuccinimide were added. Then, 200 ml of liquid ammonia were charged into the reactor at 25° C. The ammonolysis of polysuccinimide proceeded at 70° C. at 420 psi for 2 hours with stirring. After the temperature in the reactor was decreased to 20° C. and was vented, a brown gel-like polyasparagine was vacuum-dried at 40° C. for 24 hour, and 22.4 g of material were obtained.

The same reaction was also run at 40° C. for 4 hours.

Production of Poly(Asparagine-co-N-(2-Hydroxylethyl)Asparagine)

Into a pressure reactor, 19.4 g of polysuccinimide were added. The 200 ml of liquid ammonia and 6.1 g of 2-hydroxylethylamine were charged sequentially into the reactor at 5° C. The reaction was conducted at 30° C. for 1 hour. The temperature was then raised to 60° C. for an additional 2 hours. After the system was cooled to 20° C. and vented, the light brown gel-like material was vacuum-dried at 40° C. for 24 hours. A copolymer of asparagine with N-(2-hydroxylethyl)asparagine was obtained.

Production of N-Amido-Polyasparagine

Into a pressure reactor, 19.4 g of polysuccinimide and 0.24 g of urea were added. The 200 ml of liquid ammonia were charged into the reactor at 25° C. The reaction was conducted at 90° C. for 2 hours. Next the system was cooled to 20° C. and vented, and the material was vacuum-dried at 40° C. for 24 hours. Polyasparagine with an amido-cap on the N-terminal was obtained.

Analysis of Polyasparagine Produced

FIG. 1 shows Fourier transform infrared spectra of polysuccinimide (the upper spectrum) and the polyasparagine produced by the present method. Two regions of the spectra demonstrate the conversion of PSI to PASN in the reaction. The table below shows the source of the absorption, the absorbing frequency, and the reference frequency taken from *Introduction to Spectroscopy* (Donald L. Pavia, et al, 1979):

|      |           | Frequency (cm$^{-1}$) | Ref. Frequency (cm$^{-1}$) |
|------|-----------|------------------------|----------------------------|
| PSI  | —N—H (terminal N—H) | 3250         | Single Band 3500-3100      |
| PASN | —N—H2     | 3309, 3193             | Double Band 3500-3100      |
| PSI  | Imide C=O | 1786, 1718             |                            |
| PASN | Amide C=O | 1663                   | 1670-1640                  |

The shift to lower frequency by the imide C=O to amide C=O groups has been documented as evidence of conversion in *J. Am. Chem. Soc.*, 121, 923–930 (1999).

The molecular weight of PASN was determined using gel permeation chromatography and a refractive index detector, using polysaccharides as the calibration standards. Due to the need for bracketing the molecular weight with standards, polyacrylamide (more similar to the polyasparagine produced by the present process) could not be used. However, polyacrylamide having a certified standard molecular weight was run using the same polysaccharide calibration system. The polyacrylamide standard had a certified Mw of 21,000 and a measured Mw of 14,392. The PASN of the present invention had a measured Mw of 5420, giving an extrapolated Mw of 8250.

Figure 2B:
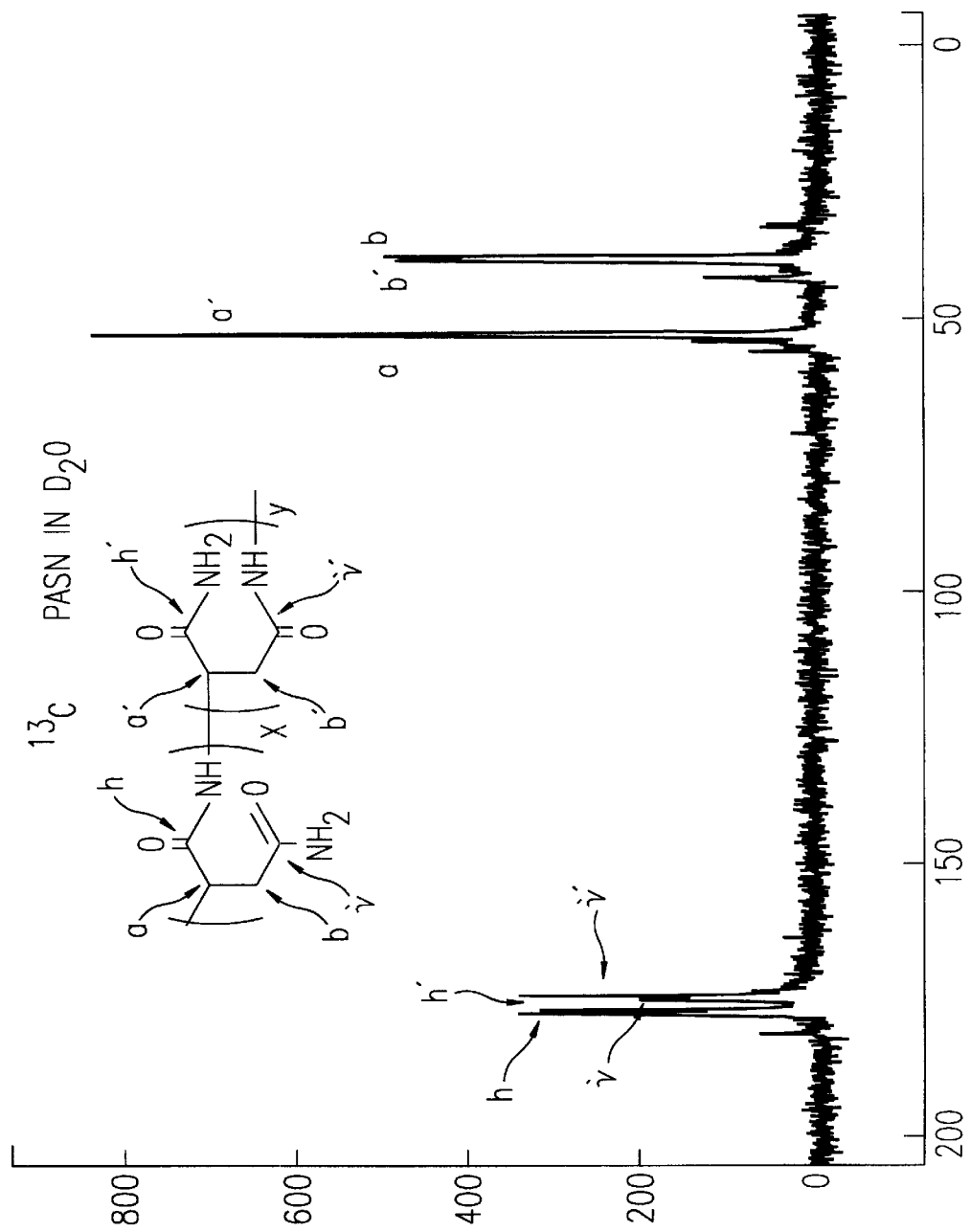

FIGS. 2a and 2b provide the $^{13}$C NMR spectra of the PSI starting material and PASN of the present invention, respectively, providing further evidence of the essentially complete conversion of PSI to PASN by the present process. The changes in chemical shifts and splitting patterns are indicative of relatively complete conversion to PASN with little or no by products produced. The raw data for relevant portions of the spectra are reproduced in the table below:

|      |            | Chemical Shift (ppm) |
|------|------------|----------------------|
| PSI  | Imide C=O  | 173.6                |
|      |            | 172.3                |
| PASN | Amide C=O  | 177.9; 177.3         |
|      |            | 175.3; 174.6         |
| PSI  | Methylene C| 47.4                 |
|      |            | 32.7                 |
| PASN | Methylene C| 53.4; 53.1           |
|      |            | 39.6; 38.9           |

Nutrient Release Properties of PASN

In order to determine the nitrogen nutrient release from the PASN of the present invention, tests were run using urea, PASN and 50% urea/50% PASN. A measured quantity of each test material was incubated at 30° C. and 50% relative humidity in Mississippi brown loam soil. At the times indicated below, the soil was extracted and each extract analyzed for % ammonia-nitrogen and % nitrate-nitrogen. The % available nitrogen was then calculated. The results are summarized below.

|      | % Available Nitrogen |      |                  |
|------|------|------|------------------|
| DAYS | Urea | PASN | 50% Urea/50% PASN |
| 3    | 82.4 | 4.9  | 53.8             |
| 10   | 99.2 | 15.8 | 61.9             |
| 21   | 92.7 | 32.9 | 80.7             |

Obviously, numerous modifications and variations of the present invention are possible in light of the above teachings. It is therefore to be understood that within the scope of the appended claims, the invention may be practiced otherwise than as specifically described herein.

What is claimed is:

1. A fertilizer composition comprising a polyasparagine having from 12 to 50 wt % of nitrogen and an agricultural carrier.

2. The fertilizer composition according to claim 1, wherein the composition further comprises urea.

3. The fertilizer composition according to claim 2, wherein the urea is present in an amount of from 10 to 90 wt %, based on total composition weight.

* * * * *

UNITED STATES PATENT AND TRADEMARK OFFICE
CERTIFICATE OF CORRECTION

PATENT NO. : 6,562,941 B2
DATED : May 13, 2003
INVENTOR(S) : Zhongxin Ma

It is certified that error appears in the above-identified patent and that said Letters Patent is hereby corrected as shown below:

<u>Column 2,</u>
Line 63, change "h" to -- hrs. --

<u>Column 4,</u>
Line 35, remove "and"
Line 37, insert -- and -- after "ammoinia,"

<u>Column 5,</u>
Line 50, change "$(cm^1)$" to -- $(cm^{-1})$ --

Signed and Sealed this

Twenty-third Day of December, 2003

JAMES E. ROGAN
*Director of the United States Patent and Trademark Office*